(12) United States Patent
Isogai

(10) Patent No.: US 9,309,805 B2
(45) Date of Patent: Apr. 12, 2016

(54) TURBOCHARGER

(71) Applicant: OTICS Corporation, Nishio (JP)

(72) Inventor: Tomoyuki Isogai, Aichi (JP)

(73) Assignee: OTICS Corporation, Nishio (JP)

( * ) Notice: Subject to any disclaimer, the term of this patent is extended or adjusted under 35 U.S.C. 154(b) by 0 days.

(21) Appl. No.: 14/217,688

(22) Filed: Mar. 18, 2014

(65) Prior Publication Data

US 2014/0290242 A1 Oct. 2, 2014

(30) Foreign Application Priority Data

Mar. 28, 2013 (JP) .................. 2013-068474

(51) Int. Cl.
*F02B 37/18* (2006.01)
(52) U.S. Cl.
CPC ............. *F02B 37/183* (2013.01); *F02B 37/186* (2013.01); *Y02T 10/144* (2013.01)
(58) Field of Classification Search
CPC .... F02B 37/183; F02B 37/186; F16K 1/2014; F16K 1/2078; Y02T 10/144
USPC ................. 60/602, 605.1
See application file for complete search history.

(56) References Cited

U.S. PATENT DOCUMENTS

| | | | |
|---|---|---|---|
| 2006/0213195 A1* | 9/2006 | Leavesley | ................ 60/605.1 |
| 2011/0173974 A1* | 7/2011 | Grabowska | ................ 60/602 |
| 2012/0312010 A1* | 12/2012 | Yasoshima | ................ 60/602 |
| 2012/0328416 A1* | 12/2012 | Igarashi et al. | ................ 415/159 |

FOREIGN PATENT DOCUMENTS

| | | |
|---|---|---|
| CN | 102165166 A | 8/2011 |
| CN | 102713198 A | 10/2012 |
| CN | 102822472 A | 12/2012 |
| JP | H11-125120 A | 5/1999 |
| JP | 2005-351089 | 12/2005 |
| JP | 2013-15102 A | 1/2013 |

OTHER PUBLICATIONS

Extended Search Report issued May 2, 2014 in European Patent Application No. 14158862.4.
Office Action mailed Dec. 9, 2015, in Chinese Patent Application No. 201410117479.7 (with English Translation).

* cited by examiner

*Primary Examiner* — Audrey K Bradley
(74) *Attorney, Agent, or Firm* — Oblon, McClelland, Maier & Neustadt, L.L.P

(57) ABSTRACT

The present invention provides a turbocharger that prevents a seizure of a shaft member, prevents a leakage of exhaust gas, suppresses deterioration of components, and reduces a number of components. The turbocharger includes a waste gate valve which is connected to the shaft member rotatably supported by penetrating a support hole of the turbine housing. The waste gate valve includes an inclined surface formed at a portion facing an opening of a bypass passage. When the waste gate valve is opened, exhaust gas flown into the bypass passage presses the inclined surface, thrust force is applied to the shaft member in a shaft direction, and a seal contact portion is pressed against a peripheral edge of the support hole via a seal member.

7 Claims, 6 Drawing Sheets

TURBOCHARGER

CROSS-REFERENCE

This application claims priority to Japanese patent application no. 2013-068474 filed on Mar. 28, 2013, the contents of which are entirely incorporated herein by reference.

BACKGROUND OF THE INVENTION

1. Field of the Invention

The present invention relates to a turbocharger including a turbine housing.

2. Description of Related Art

A turbocharger mounted to a vehicle or the like is configured to compress air, which is sucked by forcibly rotating a compressor impeller by the rotation of a turbine impeller connected to the compressor impeller by exhaust gas, and to exhaust the compressed air toward an internal combustion engine. The turbocharger is also provided with a bypass passage connected to an upstream side and a downstream side of the turbine impeller for allowing the flown exhaust gas to bypass the turbine impeller, and a waste gate valve that opens and closes an opening of the bypass passage.

The waste gate valve is configured to control its open/close state from the outside of a turbine housing storing the turbine impeller via a shaft, which is rotatably supported by being inserted into a through-hole (support hole) formed on the turbine housing. It may be considered that the exhaust gas, passing through the turbine housing, from the internal combustion engine leaks to the outside of the turbine housing from a gap between the support hole and the shaft. In order to prevent this leakage, the gap between the support hole and the shaft may be considered to be eliminated. However, since the turbine housing has a high temperature because of the high-temperature exhaust gas from the internal combustion engine passing through the turbine housing, there is a fear of an occurrence of seizure between the support hole and the shaft, if the gap between the support hole and the shaft is eliminated.

In view of the above-mentioned problem, Patent Document 1 describes a configuration in which a gap is formed between a support hole (bush) and a shaft to prevent the seizure as well as to prevent the leakage of exhaust gas. Specifically, a shaft inserted into the bush is connected to a waste gate valve support portion on the inside of the turbine housing, and connected to a link on the outside of the turbine housing. A waved washer serving as a biasing member is provided between an outer end face of the bush and the link, whereby a seal member provided between an inner end face of the bush and the waste gate valve support portion is pressed to seal on the inside of the turbine housing. With this configuration, the gap between the bush and the shaft is secured to prevent the seizure of the shaft as well as to prevent the leakage of the exhaust gas.

PATENT DOCUMENT

Patent Document 1: JP-A-2005-351089

SUMMARY OF THE INVENTION

However, in the configuration described in Patent Document 1, the seal member is always pressed by the waved washer serving as the biasing member, so that there arise problems that the portion in contact with the waved washer is easy to be worn away, and the components is deteriorated earlier. The configuration described above needs the biasing member such as the waved washer for obtaining pressure force, thereby entailing a problem of an increase in the number of components.

The present invention is accomplished in view of the foregoing problems, and aims to provide a turbocharger that prevents a seizure of a shaft member, prevents a leakage of exhaust gas, suppresses deterioration of components, and reduces a number of components.

One aspect of the invention resides in a turbocharger including a turbine impeller connected to a compressor impeller, a turbine housing that stores the turbine impeller, and a bypass passage connected to an upstream space and a downstream space of the turbine impeller in the turbine housing for bypassing the turbine impeller, wherein a flow rate of gas supplied to the turbine impeller is adjusted by opening and closing an opening of the bypass passage, the turbocharger including:

a waste gate valve that is provided to the opening so as to be capable of being opened and closed;

a shaft member that is rotatably supported by being inserted into a support hole penetrating the turbine housing;

an inner coupling member that couples the waste gate valve and one end of the shaft member at the inside of the turbine housing; and an outer coupling member that couples a control unit, which controls an open/close state of the waste gate valve, and the other end of the shaft member at the outside of the turbine housing, wherein a seal contact portion is located on the inner coupling member or the outer coupling member along a peripheral edge of the support hole that the inner coupling member or the outer coupling member faces, a seal member is provided between the seal contact portion and the peripheral edge of the support hole to seal a gap between thereof, the waste gate valve is provided with an inclined surface that tilts with respect to the shaft direction of the shaft member on a portion facing the opening, and the inclined surface is configured so as to generate thrust force from the support hole to the seal member which is applied to the shaft member by pressing the inclined surface with the gas flown into the bypass passage through the opening when the waste gate valve is opened.

In the turbocharger, the waste gate valve is provided with the inclined surface on the side facing the opening of the bypass passage. The inclined surface tilts with respect to the shaft direction of the shaft member. When pressure (supercharging pressure) of the compressed air on the suction side increases, the waste gate valve is opened to allow the exhaust gas flown into the turbine housing to bypass the turbine impeller. The exhaust gas flows into the bypass passage through the opening. The exhaust gas flown into the bypass passage through the opening presses the inclined surface, and thrust force from the support hole to the seal member is generated to the shaft member.

The thrust force allows the seal contact portion to press against the peripheral edge of the support hole via the seal member, whereby strong sealing force is generated between both of them. As a result, the leakage of the exhaust gas from the gap between the support hole and the shaft member can be prevented. Since the gap can be secured between the support hole and the shaft member, the seizure of the shaft member can be prevented.

In the turbocharger, the thrust force is caused when the exhaust gas flown into the bypass passage through the opening presses the inclined surface. In the state in which the waste gate valve is closed, slight thrust force is generated, but the strong sealing force caused by the thrust force is not exhibited, since strong pressing force for closing the opening of the bypass passage is applied to the waste gate valve by the open/close unit of the waste gate valve.

However, the state in which the waste gate valve is closed means the state in which it is unnecessary to allow the exhaust gas flown into the turbine housing to bypass by the bypass passage, and in this state, the supercharging pressure is low. In this state, the leakage of the exhaust gas from the gap between the support hole and the shaft member is difficult to be caused, since the gas pressure in the turbine housing is low. Accordingly, it is no problem if the strong sealing force caused by positively pressing the seal contact portion against the peripheral edge via the seal member is not applied.

Instead, the merits described below are obtained. The turbocharger generates strong sealing force based upon the thrust force, when strong sealing force is needed, i.e., when the gas pressure in the turbine housing is high. On the other hand, when strong sealing force is not needed, i.e., when the gas pressure in the turbine housing is low, the turbocharger does not generate the strong sealing force. This structure brings a merit of suppressing the deterioration of the components such as the seal member, compared to the case where the sealing is attained by the constant sealing force at all times. In addition, a separate member such as a waved washer for causing the strong sealing force is not needed, whereby the number of components can be reduced.

As described above, the present invention can provide a turbocharger that prevents a seizure of a shaft member, prevents a leakage of exhaust gas, suppresses deterioration of components, and reduces a number of components.

DESCRIPTION OF THE PREFERRED EMBODIMENTS

Figure 1:
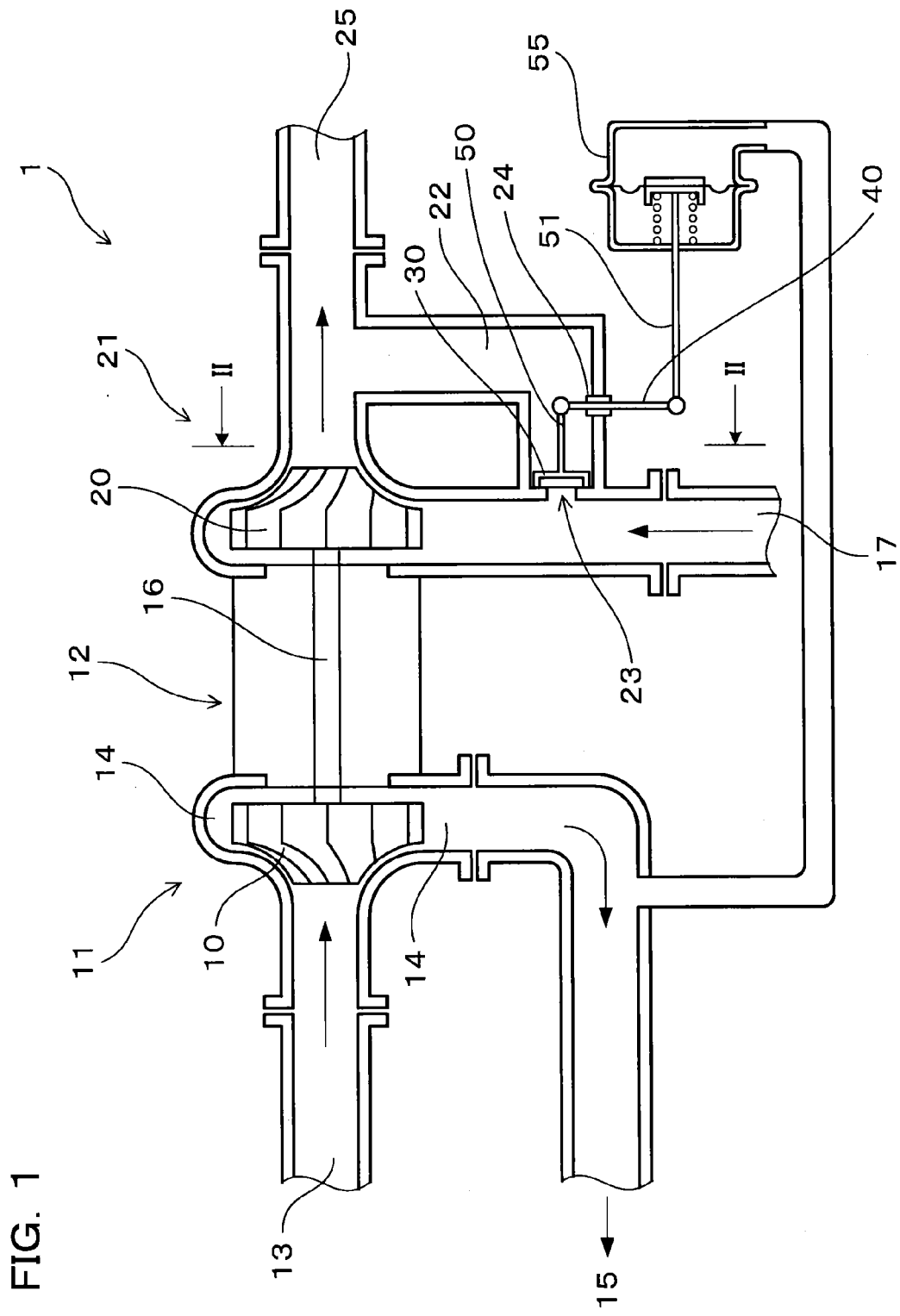
FIG. 1 is a schematic diagram illustrating a configuration of a turbocharger according to an embodiment 1.

In the turbocharger, the shape of the inclined surface is not particularly limited, and the inclined surface can be a plane having a predetermined tilt angle with respect to the shaft direction of the shaft member, or can be a curved surface curved along a parabola, a sphere, or an ellipse. The inclined surface can be formed by combining plural planes, each of which has a different tilt angle, can be formed by combining plural curved surfaces, each of which has a different curvature, or can be formed by combining a plane and a curved surface. The shape of the inclined surface can appropriately be decided in consideration of formability of the inclined surface within the range of obtaining the required thrust force.

The inclined surface of the turbocharger may have a direction from the support hole toward the seal member in the shaft direction of the shaft member. The direction in which the thrust force is generated is the direction toward the peripheral edge of the support hole that the seal contact portion faces, whereby the seal contact portion is pressed by the peripheral edge of the support hole via the seal member, and the strong sealing force is caused between both of them. As a result, the leakage of the exhaust gas from the gap between the support hole and the shaft member can be prevented. Since the gap can be secured between the support hole and the shaft member, the seizure of the shaft member can be prevented.

The seal contact portion of the turbocharger can be located on the outer coupling member.

In this case, the seal member is provided on the outside of the turbine housing. The outside of the turbine housing has a lower temperature than the inside of the turbine housing where the temperature is high because of the inflow of the high-temperature exhaust gas exhausted from the internal combustion engine. Therefore, the deterioration of the seal member is more suppressed than in the case where the seal member is provided at the inside of the turbine housing.

The waste gate valve of the turbocharger can have a projecting portion, which projects to the opening, on a portion facing the opening, and the inclined surface can be formed on the projecting portion.

In this case, the inclined surface can easily be formed, whereby the productivity is enhanced. The projecting portion may be formed integral with the waste gate valve, or may be formed by attaching a separate member on the waste gate valve at the side of the opening.

In the turbocharger, a cylindrical bush member can be arranged on the inner wall surface of the support hole of the turbine housing and can extend to the inside and outside of the turbine housing, the shaft member can be rotatably supported by the support hole via the bush member, and an end part of the bush member in the shaft direction can form the peripheral edge of the support hole. In this case, the inner wall face of the support hole that is in direct contact with the shaft member and the peripheral edge that is in direct contact with the seal member are formed from the bush member that is a separate member of the turbine housing. Therefore, the precision in forming this portion and surface smoothness of this portion can easily be enhanced. Consequently, the waste gate valve can more smoothly be opened and closed, and the deterioration of the seal member or the like can be suppressed.

Embodiment 1

An embodiment of the turbocharger will be described with reference to FIGS. 1 to 4.

As illustrated in FIG. 1, a turbocharger 1 according to the present embodiment includes a turbine impeller 20 connected to a compressor impeller 10, a turbine housing 21 storing the turbine impeller 20, and a bypass passage 22 that is connected an upstream space and a downstream space of the turbine impeller 20 in the turbine housing 21 for bypassing the turbine impeller 20. A flow rate of gas supplied to the turbine impeller 20 is adjusted by opening or closing an opening 23 of the bypass passage 22.

Figure 2:
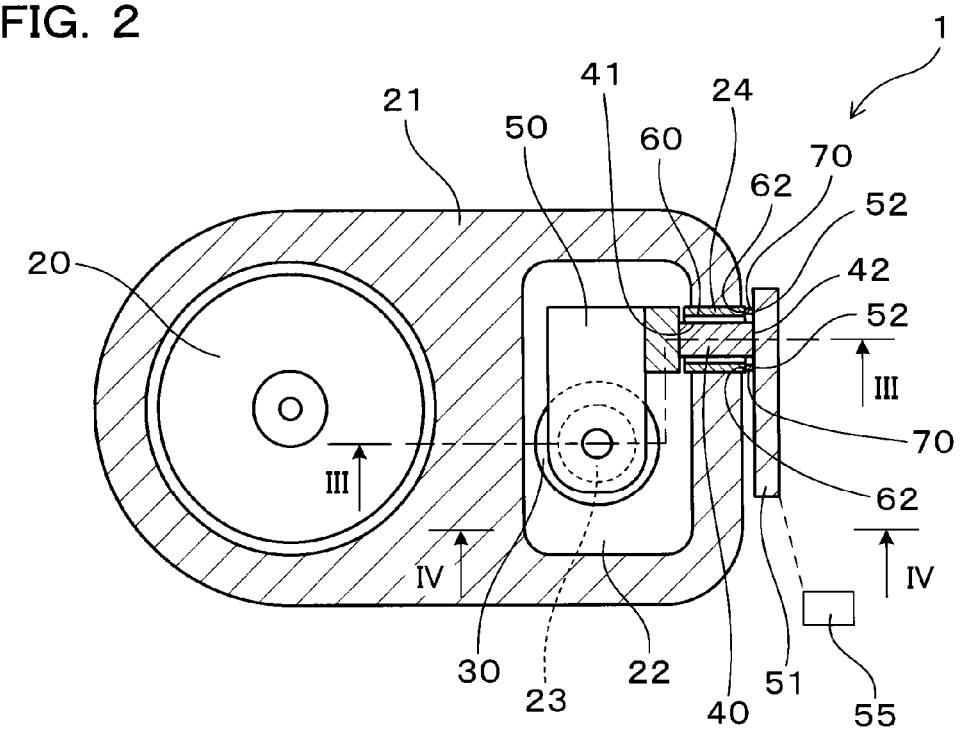
FIG. 2 is a sectional view taken along a line II-II in FIG. 1.

As illustrated in FIGS. 1 and 2, the turbocharger 1 also includes a waste gate valve 30, a shaft member 40, an inner coupling member 50, and an outer coupling member 51.

The waste gate valve 30 is provided to the opening 23 so as to be capable of being opened and closed. The shaft member 40 is rotatably supported by being inserted into a support hole 24 penetrating the turbine housing 21. The inner coupling member 50 couples the waste gate valve 30 and one end 41 of the shaft member 40 at the inside of the turbine housing 21. The outer coupling member 51 couples a control unit 55 that controls an open/close state of the waste gate valve 30 and the other end 42 of the shaft member 40 at the outside of the turbine housing 21.

Figure 3:
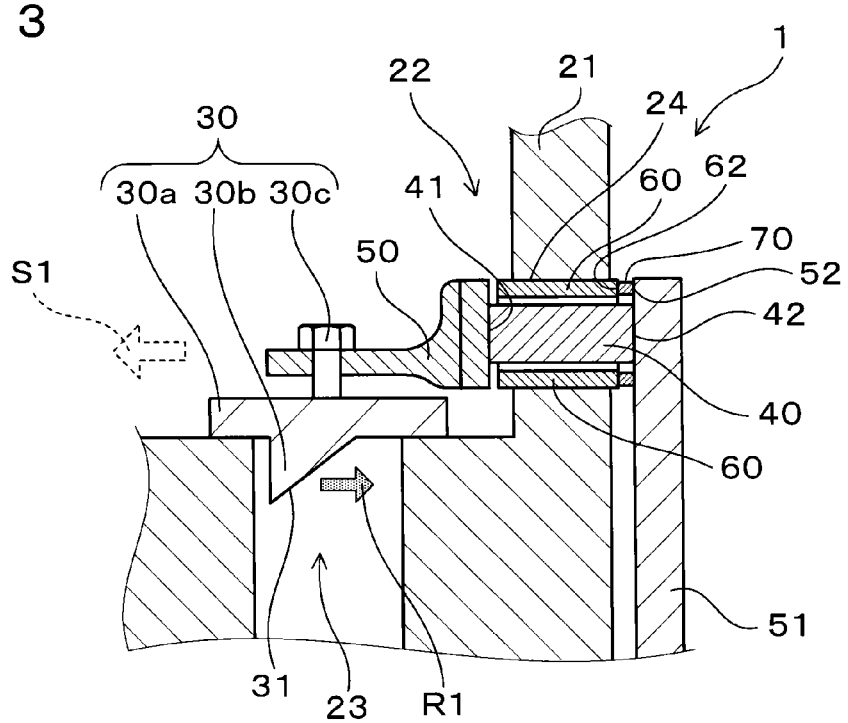
FIG. 3 is a sectional view taken along a line III-III in FIG. 2 when a waste gate valve is closed.

As illustrated in FIG. 3, a seal contact portion 52 is located on the outer coupling member 51 along a peripheral edge 62 of the support hole 24 facing the outer coupling member 51. An inclined surface 31 that tilts with respect to the shaft direction of the shaft member 40 is formed on the waste gate valve 30 at a portion facing the opening 23. The inclined surface 31 faces a direction toward a seal member 70 from the support hole 24 in the shaft direction of the shaft member.

Each component of the turbocharger 1 according to the present embodiment will be described below in detail.

As illustrated in FIG. 1, the turbocharger 1 includes a compressor housing 11, a bearing housing 12, and the turbine housing 21. The compressor housing 11 has stored therein the compressor impeller 10, and is also provided with a suction port 13 that sucks air sent to the compressor impeller 10, and a scroll chamber 14 that guides air, which is exhausted from the compressor impeller 10 and compressed, toward an internal combustion engine 15.

As illustrated in FIG. 1, the turbine housing 21 is provided opposite to the compressor housing 11 across the bearing housing 12. The turbine housing 21 has stored therein the turbine impeller 20. An exhaust manifold 17 that guides exhaust gas from the internal combustion engine is connected to the upstream side of the turbine impeller 20, while an exhaust port 25 is formed on the downstream side of the turbine impeller 20. The turbine impeller 20 is connected to the compressor impeller 10 via a rotor shaft 16 stored in the bearing housing 12. With this structure, the rotation force of the turbine impeller 20 obtained from the exhaust gas is transmitted to the compressor impeller 10 via the rotor shaft 16, and converted into the rotation force of the compressor impeller 10. Thus, compressed air is generated in the compressor housing 11.

As illustrated in FIG. 1, the bypass passage 22 is connected to the upstream space and the downstream space of the turbine impeller 20. Some exhaust gas flown into the turbine housing 21 bypasses the turbine impeller 20 to be exhausted from the exhaust port 25 by flowing through the bypass passage 22. As illustrated in FIG. 2, the opening 23, which is an inlet of the bypass passage 22, is cylindrical in general.

As illustrated in FIGS. 2 and 3, the support hole 24 is formed on a sidewall of the turbine housing 21. The support hole 24 is a cylindrical through-hole penetrating from the inside to the outside of the turbine housing 21. A cylindrical bush member 60 having an outer diameter almost equal to the inner diameter of the support hole 24 is fitted into the support hole 24. The length of the bush member 60 in the shaft direction is larger than the thickness of the sidewall of the turbine housing 21, whereby one end of the bush member 60 protrudes toward the inside of the turbine housing 21, and the other end of the bush member 60 protrudes toward the outside of the turbine housing 21. The end part protruding toward the outside of the turbine housing 21 forms the peripheral edge 62 of the support hole 24. In the present embodiment, the end face of the peripheral edge 62 is flat.

As illustrated in FIGS. 2 and 3, the shaft member 40 is rotatably supported by being inserted into the bush member 60 fitted into the support hole 24. The shaft member 40 is cylindrical, and the length of the shaft member 40 in the shaft direction is slightly larger than the length of the bush member 60 in the shaft direction. One end 41 of the shaft member 40 is located on the inside of the turbine housing 21, while the other end 42 of the shaft member 40 is located on the outside of the turbine housing 21.

The inner coupling member 50 is coupled to one end 41 of the shaft member 40. The inner coupling member 50 is a member having a tongue piece shape. One end 41 of the shaft member 40 is fixed to a base end side of the inner coupling member 50, and the waste gate valve 30 is loosely fixed on a leading end side of the inner coupling member 50 via a mounting pin 30c. Thus, the waste gate valve 30 swings by the shaft rotation of the shaft member 40 via the inner coupling member 50, whereby the opening 23 is opened and closed.

Figure 4:
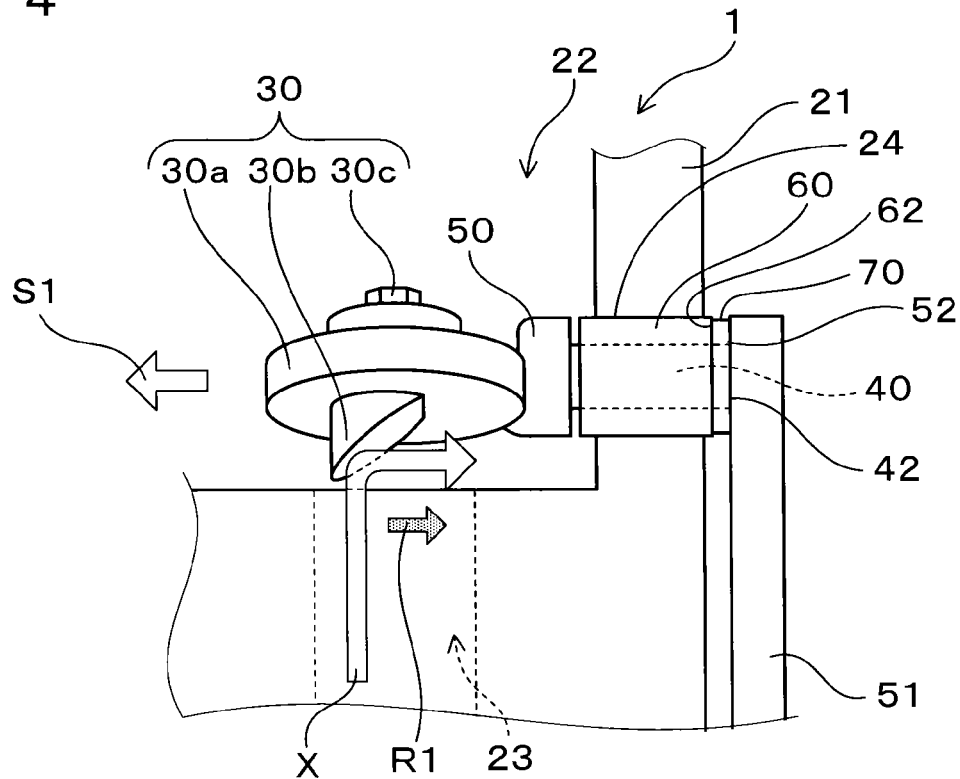
FIG. 4 is a partially perspective view taken along a line IV-IV in FIG. 2 when the waste gate valve is opened.

As illustrated in FIG. 3, the waste gate valve 30 includes a body 30a, a projecting portion 30b, and the mounting pin 30c. The body 30a has a disk-like shape having a diameter slightly larger than the diameter of the opening 23. The projecting portion 30b is formed to project toward the opening 23 from the surface of the body 30a facing the opening 23. As illustrated in FIG. 4, the projecting portion 30b has a shape formed by cutting a cylinder diagonally in the shaft direction, and the longitudinal section of the projecting portion 30b is a rectangular triangle as illustrated in FIG. 3. The portion corresponding to the hypotenuse forms the inclined surface 31.

As illustrated in FIG. 3, the inclined surface 31 is a flat surface tilted with respect to the shaft direction of the shaft member 40, and the direction which the inclined surface 31 faces in the shaft direction of the shaft member 40 is toward the seal member 70 from the support hole 24. In the present embodiment, the seal member 70 is located at the outside of the turbine housing 21. Therefore, the "direction toward the seal member 70 from the support hole 24" means a direction R1 from the inside toward the outside of the turbine housing 21. Accordingly, in the present embodiment, the direction which the inclined surface 31 faces in the shaft direction of the shaft member 40 is the direction R1 toward the outside from the inside of the turbine housing 21.

The mounting pin 30c is provided to project from the body 30a on the opposite side of the projecting portion 30b. The horizontal section of the shaft portion of the mounting pin 30c is rectangle. A rectangular hole slightly larger than the horizontal section of the shaft portion of the mounting pin 30c is formed on the leading end side of the inner coupling member 50, and the waste gate valve 30 is loosely fixed to the inner coupling member 50 as described above by inserting the shaft portion of the mounting pin 30c into the rectangular hole. This structure prevents the waste gate valve 30 from rotating around the shaft portion of the mounting pin 30c, whereby the direction of tilt of the inclined surface 31 is kept constant.

As illustrated in FIG. 2, the outer coupling member (link) 51 is a rod member, wherein one end thereof is fixed to the other end 42 of the shaft member 40. The other end side of the outer coupling member 51 is connected to the control unit (actuator) 55. For example, the control unit 55 is mounted on an outlet of the scroll chamber 14. Some compressed air is guided to the control unit 55 in order that supercharging pressure caused in the turbocharger 1 is controlled. Specifically, the control unit 55 controls to open and close the opening 23 by the process of swinging the waste gate valve 30 through the rotation of the shaft member 40 about the shaft via the outer coupling member 51 based upon the change in the supercharging pressure.

In the present embodiment, as illustrated in FIGS. 2 and 3, the seal contact portion 52 is located on the portion, facing the peripheral edge 62 of the support hole 24, of the outer coupling member 51. The seal member 70 is provided between the peripheral edge 62 of the support hole 24 and the seal contact portion 52. Therefore, the seal member 70 is provided at the outside of the turbine housing 21. The seal member 70 is composed of an annular member formed along the peripheral edge 62 of the support hole 24.

Subsequently, an operation of the turbocharger 1 will be described.

As illustrated in FIG. 1, exhaust gas from the internal combustion engine is firstly supplied to the turbine impeller 20 in the turbine housing 21 via the exhaust manifold 17. Thus, the speed of the revolution of the turbine impeller 20 increases, whereby the speed of the revolution of the compressor impeller 10 increases via the rotor shaft 16. With this operation, the intake volume from the suction port 13 increases, whereby compressed air is generated. The compressed air is exhausted toward the internal combustion engine 15 via the scroll chamber 14, which brings a supercharging state. When the supercharging pressure reaches a predetermined value, the control unit 55 allows the shaft member 40 to rotate forward via the outer coupling member 51. Thus, the waste gate valve 30 closing the opening 23 swings via the inner coupling member 50 to be separated from the opening 23, whereby the opening 23 is opened. Then, some of exhaust gas bypasses the turbine impeller 20 to reach the exhaust port 25 through the bypass passage 22, and is exhausted therefrom. As a result, the speed of the revolution of the turbine impeller 20 is controlled, whereby the speed of the revolution of the compressor impeller 10 is also controlled. Consequently, the turbocharger is controlled to have a predetermined intake volume and predetermined supercharging pressure. When the supercharging pressure becomes not more than the predetermined value afterward, the control unit 55 allows the shaft member 40 to rotate backward via the outer coupling member 51 to close the waste gate valve 30, in order to increase the supercharging pressure. In this way, the waste gate valve 30 is opened and closed to control the supercharging pressure.

The operation and effect of the turbocharger 1 will be described next in detail.

In the turbocharger 1, when the supercharging pressure is higher than the predetermined value, the waste gate valve 30 is opened to allow exhaust gas X to be flown into the bypass passage 22 via the opening 23 as illustrated in FIG. 4. When the exhaust gas X flows into the bypass passage 22, it presses the inclined surface 31 of the waste gate valve 30. Therefore, thrust force S1 is applied to the shaft member 40 in the shaft direction. As illustrated in FIG. 3, the direction which the inclined surface 31 faces in the shaft direction of the shaft member 40 is the direction R1 from the support hole 24 toward the seal member 70. Therefore, as illustrated in FIGS. 3 and 4, the direction of applying the thrust force S1 is opposite to the direction R1, i.e., the direction from the outside toward the inside of the turbine housing 21. This thrust force S1 allows the seal contact portion 52 to press against the peripheral edge 62 of the support hole 24 via the seal member 70, whereby strong sealing force is generated between both of them. As a result, the leakage of the exhaust gas from the gap between the support hole 24 and the shaft member 40 can be prevented. This configuration can secure the gap between the support hole 24 (the bush member 60) and the shaft member 40, thereby preventing the seizure of the shaft member 40.

On the other hand, when the supercharging pressure is lower than the predetermined value, it is unnecessary to bypass the exhaust gas, flowing into the turbine housing 21, by the bypass passage 22. Therefore, the waste gate valve 30 is closed. In this state, slight thrust force S1 is generated, but strong sealing force caused by the thrust force S1 is not exhibited, since strong pressing force for closing the opening 23 is applied to the waste gate valve 30 by the control unit 55 via the outer coupling member 51. However, when the supercharging pressure is low, the gas pressure in the turbine housing 21 is also low, so that the leakage of the exhaust gas from the gap between the support hole 24 and the shaft member 40 is difficult to be caused. Accordingly, it is no problem if the strong sealing force caused by positively pressing the seal contact portion 52 against the peripheral edge 62 via the seal member 70 is not applied. Instead, this structure can suppress the deterioration of the components such as the seal member 70, compared to the case where the sealing is attained by the constant sealing force at all times. In addition, a biasing member for causing the strong sealing force is not separately needed, whereby the number of components can be reduced.

As described above, the turbocharger 1 described above prevents the seizure of the shaft member 40, prevents the leakage of the exhaust gas, reduces the deterioration of the components such as the seal member 70, and reduces the number of the components.

As illustrated in FIG. 2, the seal member 70 is arranged at the outside of the turbine housing 21 in the turbocharger 1 described above. The outside of the turbine housing 21 has a lower temperature than the inside of the turbine housing 21 where the temperature is high because of the inflow of the high-temperature exhaust gas exhausted from the internal combustion engine. Therefore, the deterioration of the seal member 70 is more suppressed than in the case where the seal member 70 is provided at the inside of the turbine housing 21.

In the turbocharger 1, the bush member 60 is fitted into the support hole 24, wherein the inner wall face of the bush member 60 and the shaft member 40 are in direct contact with each other, and the end part (peripheral edge 62) of the bush member 60 and the seal member 70 are in direct contact with each other. Since the bush member 60 having more excellent forming precision and surface smoothness than the turbine housing 21 is used, the waste gate valve 30 can more smoothly be opened and closed, and further, the deterioration of the seal member 70 can be suppressed.

The seal member 70 can be provided with a lip portion extending in the diameter direction of the seal member 70 on the side of the peripheral edge 62 or on the side of the seal contact portion 52. In this case, the contact area between the seal member 70 and the peripheral edge 62 or the contact area between the seal member 70 and the seal contact portion 52 increases, whereby the sealing force can be enhanced.

In the present embodiment, the seal member 70 is provided between the peripheral edge 62 corresponding to the end part of the bush member 60 and the seal contact portion 52. However, it is not limited thereto. The outside portion of the end part of the bush member 60 in the diameter direction can be defined as the peripheral edge of the support hole 24 on the outside surface of the turbine housing 21, and the seal member can be provided between this peripheral edge and the seal contact portion, facing this peripheral edge, of the outer coupling member 51. In this case, the contact area between the seal member and the peripheral edge of the support hole 24 can be secured wider than the area of the end part of the bush member, whereby the sealing force can further be enhanced.

In the present embodiment, the inclined surface 31 is formed by the projecting portion 30b. Therefore, the inclined surface 31 can easily be formed, whereby the productivity of the turbocharger 1 is enhanced.

Figure 5:
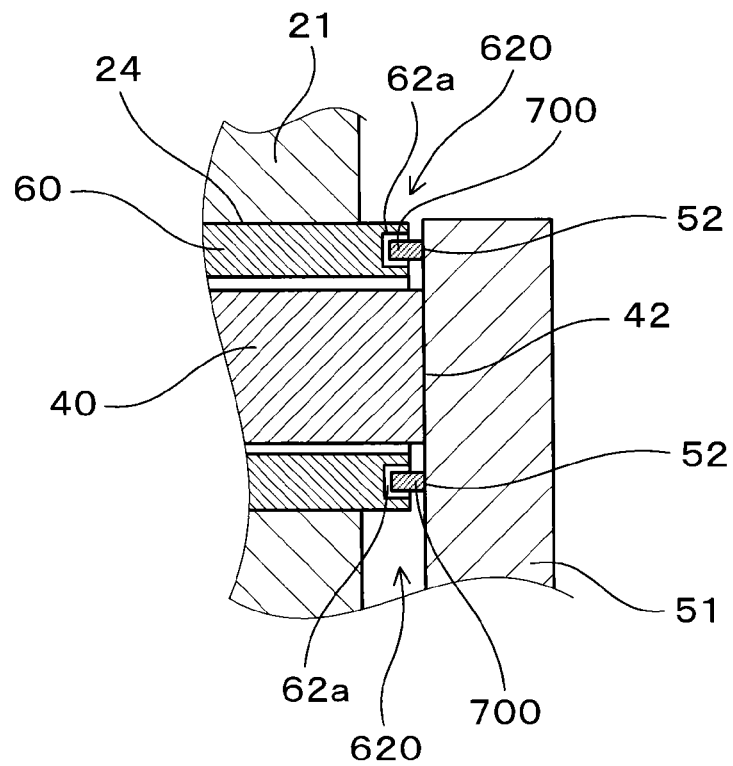
FIG. 5 is a modification of the peripheral edge of the support hole and the seal member according to the embodiment 1.
Figure 6:
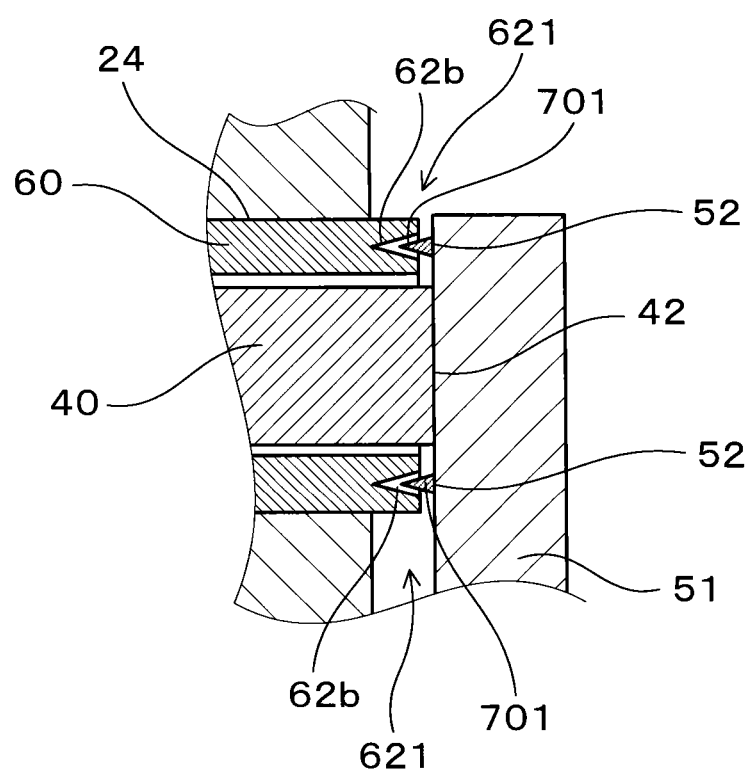
FIG. 6 is another modification of the peripheral edge of the support hole and the seal member according to the embodiment 1.

In the present embodiment, the end face of the peripheral edge 62 of the support hole 24 (bush member 60) is flat. However, instead of this, a peripheral edge 620 having a groove portion 62a with a rectangular section formed along the seal contact portion 52 is formed, and a seal member 700 can be formed to have an annular shape with a rectangular section, a part of which is fitted into the groove portion 62a, as illustrated in FIG. 5. Alternatively, as illustrated in FIG. 6, a peripheral edge 621 having a groove portion 62b with a V-shaped section is formed, and a seal member 701 can be formed to have an annular shape with a triangular section, a part of which is fitted into the groove portion 62b. In these cases, since the seal members 700 and 701 are fitted into the corresponding groove portions 62a and 62b, the sealing force is enhanced, whereby the effect of preventing the leakage of the exhaust gas is enhanced.

In the present embodiment, the inclined surface 31 of the waste gate valve 30 is flat. However, it is not limited thereto, and as illustrated in FIGS. 7A to 7D, waste gate valves 301, 302, 303, and 304, each having corresponding inclined surfaces 311, 312, 313, and 314, instead of the inclined surface 31, can be used.

Figure 7A:
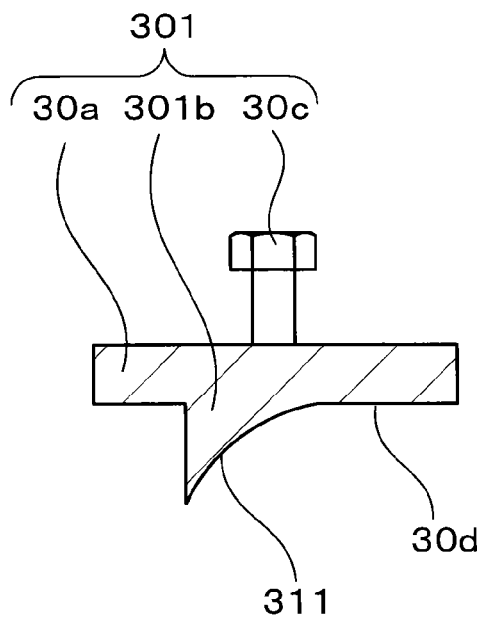
FIG. 7A is a sectional view of a position of the waste gate valve corresponding to the position along the line III-III in FIG. 2 according to a first modification.

The waste gate valve 301 according to a first modification includes a projecting portion 301b as illustrated in FIG. 7A. The portion of the projecting portion 301b opposite to the mounting pin 30c becomes the inclined surface 311. The longitudinal section of the inclined surface 311 is a part of a parabola. The inclined surface 311 has a curved surface gently and consecutively curved from the tip end of the projecting portion 301b to a back surface 30d of the body 30a.

Figure 7B:
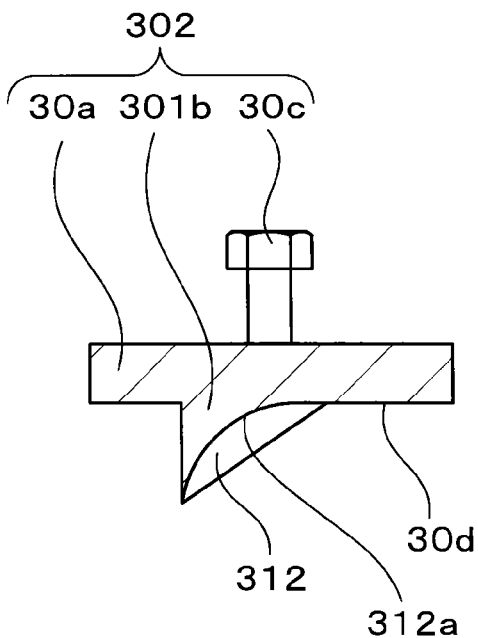
FIG. 7B is a sectional view of a position of the waste gate valve corresponding to the position along the line III-III in FIG. 2 according to a second modification.

The waste gate valve 302 according to a second modification includes a projecting portion 301b as illustrated in FIG. 7B. The portion of the projecting portion 301b opposite to the mounting pin 30c becomes the inclined surface 312. The inclined surface 312 has a curved surface formed by hollowing the inclined surface 31 of the waste gate valve 30 illustrated in FIG. 3 in a bowl shape. As illustrated in FIG. 7B, the longitudinal section 312a of the inclined surface 312 is a part of a parabola, and the inclined surface 312 has a curved surface gently and consecutively curved from the tip end of the projecting portion 301b to the back surface 30d of the body 30a.

Figure 7C:
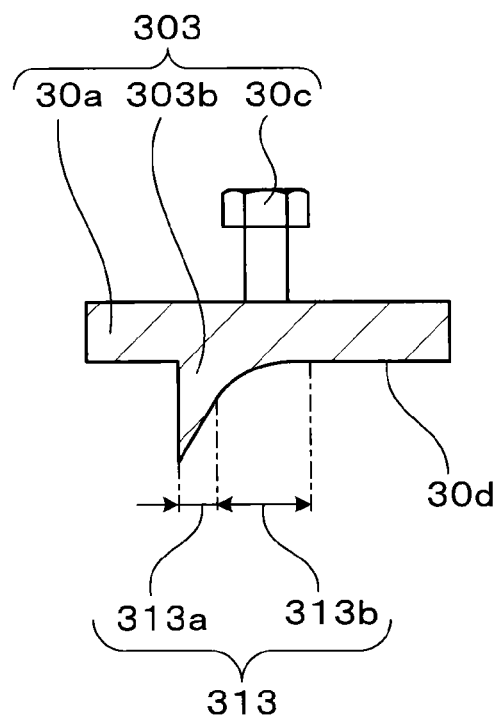
FIG. 7C is a sectional view of a position of the waste gate valve corresponding to the position along the line III-III in FIG. 2 according to a third modification.

The waste gate valve 303 according to a third modification includes a projecting portion 303b as illustrated in FIG. 7C. The portion of the projecting portion 303b opposite to the mounting pin 30c becomes the inclined surface 313. The inclined surface 313 includes a plane portion 313a and a curved portion 313b. The plane portion 313a is formed from the tip end of the projecting portion 303b toward the back surface 30d of the body 30a, and communicates with the curved portion 313b on the center of the projecting portion 303b in the height direction. The curved portion 313b is formed from a joint portion where the plane portion 313a is communicated to the curved portion 313b to the back surface 30d, and has a curved surface gently and consecutively curved to the back surface 30d.

Figure 7D:
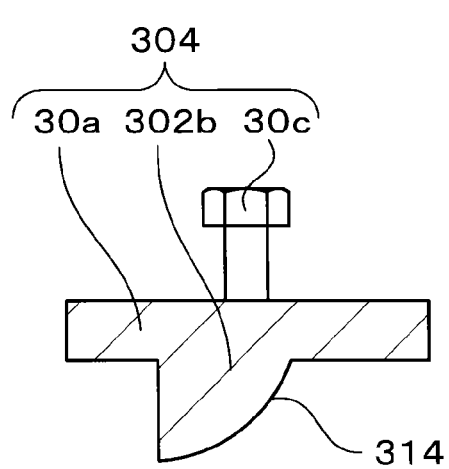
FIG. 7D is a sectional view of a position of the waste gate valve corresponding to the position along the line III-III in FIG. 2 according to a fourth modification.

The waste gate valve 304 according to a fourth modification includes a projecting portion 302b as illustrated in FIG. 7D. The portion of the projecting portion 302b opposite to the mounting pin 30c becomes the inclined surface 314. The longitudinal section of the inclined surface 314 is a part of a parabola, and the inclined surface 314 has a curved surface curved to slightly project toward the side opposite to the mounting pin 30c.

The thrust force S1 can be obtained even by the waste gate valves 301, 302, 303, and 304, like the waste gate valve 30 illustrated in FIG. 3.

Embodiment 2

Figure 8:
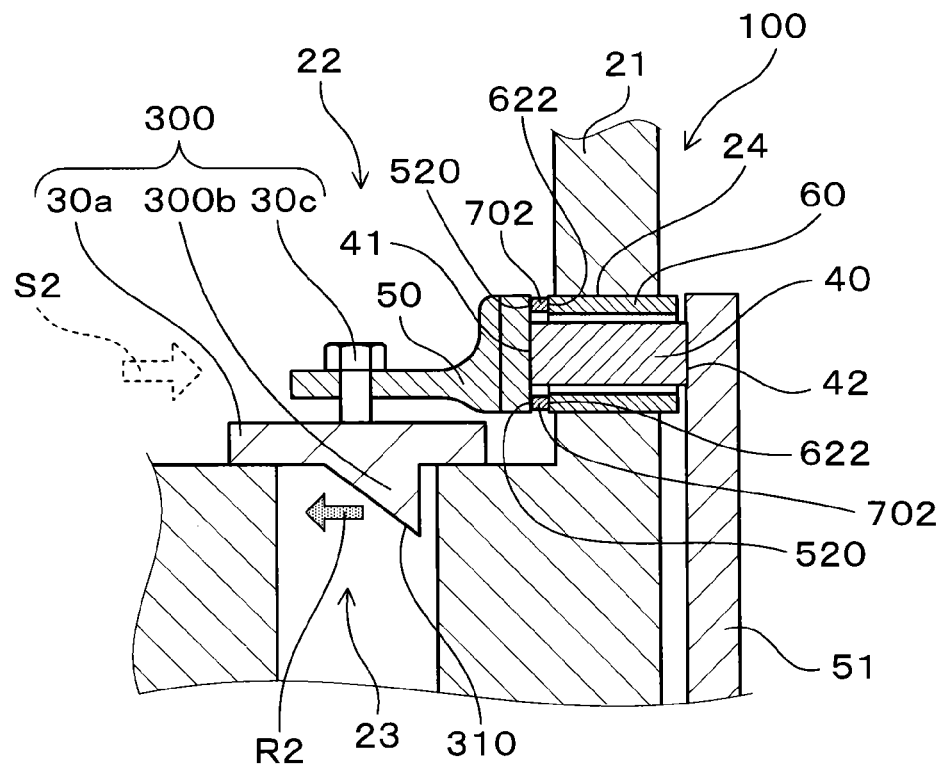
FIG. 8 is a sectional view of a position corresponding to the position along the line III-III when the waste gate valve is closed according to an embodiment 2.
Figure 9:
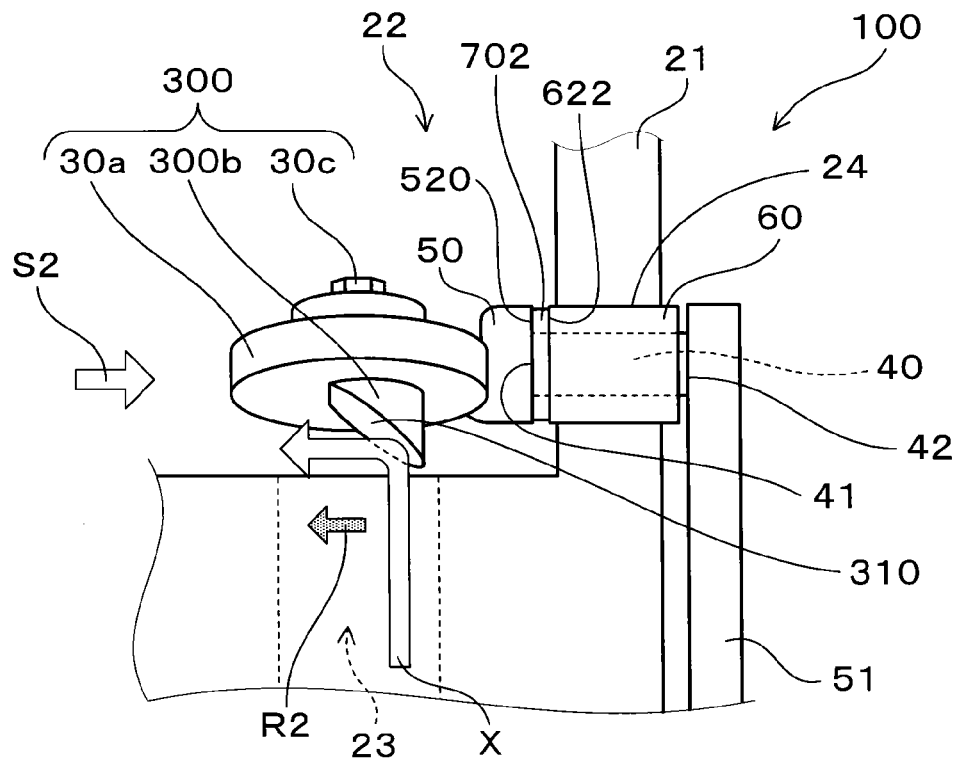
FIG. 9 is a partially perspective view of a section corresponding to the position along the line IV-IV when the waste gate valve is opened according to the embodiment 2.

As illustrated in FIGS. 8 and 9, a turbocharger 100 according to the present embodiment includes a waste gate valve 300 instead of the waste gate valve 30 and a seal member 702 instead of the seal member 70 in the turbocharger 1 according to the embodiment 1. An end part of the bush member 60 protruding to the inside of the turbine housing 21 forms a peripheral edge 622 of the support hole 24. The components same as those in the embodiment 1 are identified by the same numerals, and the redundant description will not be repeated.

In the turbocharger 100 according to the present embodiment, a seal contact portion 520 is located on the inner coupling member 50 along the peripheral edge 622 of the support hole 24, the inner coupling member 50 facing the peripheral edge 622, as illustrated in FIG. 8. The seal member 702 is provided between the seal contact portion 520 and the peripheral edge 622.

As illustrated in FIG. 8, the waste gate valve 300 has a projecting portion 300b, and an inclined surface of the projecting portion 300b facing the opening 23 forms an inclined surface 310. The inclined surface 310 is a flat surface tilted with respect to the shaft direction of the shaft member 40, and the direction which the inclined surface 310 faces in the shaft direction of the shaft member 40 is a direction toward the seal member 702 from the support hole 24. In the present embodiment, since the seal member 702 is located at the inside of the turbine housing 21 as illustrated in FIGS. 8 and 9, the "direction toward the seal member 702 from the support hole 24" means a direction R2 from the outside toward the inside of the turbine housing 21. Therefore, the direction which the inclined surface 310 faces in the shaft direction of the shaft member 40 is the direction R2 from the outside to the inside of the turbine housing 21 in the present embodiment.

As illustrated in FIG. 9, when the waste gate valve 300 is opened, the exhaust gas X is flown through the opening 23 to press the inclined surface 310 of the waste gate valve 300. Therefore, thrust force S2 is applied to the shaft member 40 in the shaft direction. Since the inclined surface 310 tilts as described above, the thrust force S2 is applied in the direction opposite to the direction in the embodiment 1, i.e., in the direction toward the outside from the inside of the turbine housing 21. This thrust force S2 allows the seal contact portion 520 to press against the peripheral edge 622 of the support hole 24 via the seal member 702, whereby strong sealing force is generated between both of them. As a result, the leakage of the exhaust gas from the gap between the support hole 24 and the shaft member 40 can be prevented. Since the gap is secured between the support hole 24 and the shaft member 40, the seizure of the shaft member 40 can be prevented.

The turbocharger 100 according to the embodiment 2 brings the operation and effect same as those of the embodiment 1, except for the operation and effect brought by the seal member 70 provided at the outside of the turbine housing 21.

The seal member for sealing the peripheral edge of the support hole 24 may be provided at both the outside and the inside of the turbine housing 21. Specifically, the seal member 70 may be provided between the outer coupling member 51 and the peripheral edge 62 of the support hole 24 as illustrated in FIG. 3, and the seal member 702 may be provided between the inner coupling member 50 and the peripheral edge 622 of the support hole 24 as illustrated in FIG. 8. In this case, the inclined surface of the waste gate valve may be either one of the inclined surface 31 illustrated in FIG. 3 and the inclined surface 310 illustrated in FIG. 8. In this case, the strong sealing force can be obtained by the thrust force S1 (S2) generated by the seal member 70 (702), and in addition to this, sealing force to some extent can be expected even by the other seal member 702 (70), in the state in which the waste gate valve is opened. Accordingly, the effect of preventing the leakage of the exhaust gas from the gap between the support hole 24 and the shaft member 40 can further be enhanced.

The invention claimed is:

1. A turbocharger including a turbine impeller connected to a compressor impeller, a turbine housing that stores the turbine impeller, and a bypass passage connected to an upstream space and a downstream space of the turbine impeller in the turbine housing for bypassing the turbine impeller, wherein a flow rate of gas supplied to the turbine impeller is adjusted by opening and closing an opening of the bypass passage, the turbocharger comprising:
    a waste gate valve that is provided to the opening so as to be capable of being opened and closed;
    a shaft member that is rotatably supported by being inserted into a support hole penetrating the turbine housing;
    an inner coupling member that couples the waste gate valve and a first end of the shaft member at an inside of the turbine housing;
    an outer coupling member that couples a control unit, which controls an open/close state of the waste gate valve, and a second end of the shaft member at an outside of the turbine housing;
    a seal contact portion located on the inner coupling member or the outer coupling member along a peripheral edge of the support hole that the inner coupling member or the outer coupling member faces; and
    a seal member provided between the seal contact portion and peripheral edge of the support hole to seal a gap between thereof,
    wherein the waste gate valve is provided with a projecting portion projected on the opening on a portion facing the opening, an end face of the projecting portion in a projecting direction having only a single inclined surface that tilts with respect to a shaft direction of the shaft member, the single inclined surface facing a first direction parallel to the shaft direction of the shaft member, a surface of the projecting portion facing a second direction parallel to the shaft direction of the shaft member opposite the first direction, and the surface being vertical to the shaft direction of the shaft member, and
    wherein the single inclined surface is configured so as to generate thrust force from the seal member to the support hole which is applied to the shaft member by pressing the single inclined surface with the gas flown into the bypass passage through the opening when the waste gate valve is opened such that the gas flows in the first direction after contacting the single inclined surface, the thrust force is generated in the second direction and the gap is sealed.

2. The turbocharger according to claim 1, wherein the inclined surface has a direction from the support hole toward the seal member in the shaft direction of the shaft member.

3. The turbocharger according to claim 2, further comprising a cylindrical bush member arranged on an inner wall surface of the support hole of the turbine housing which extends to the inside and outside of the turbine housing, the shaft member being rotatably supported by the support hole via the bush member, and an end part of the bush member in the shaft direction forming the peripheral edge of the support hole.

4. The turbocharger according to claim 1, wherein the seal contact portion is located on the outer coupling member.

5. The turbocharger according to claim 4, further comprising a cylindrical bush member arranged on an inner wall surface of the support hole of the turbine housing which extends to the inside and outside of the turbine housing, the shaft member being rotatably supported by the support hole via the bush member, and an end part of the bush member in the shaft direction forming the peripheral edge of the support hole.

6. The turbocharger according to claim 1, further comprising a cylindrical bush member arranged on an inner wall surface of the support hole of the turbine housing which extends to the inside and outside of the turbine housing, the shaft member being rotatably supported by the support hole via the bush member, and an end part of the bush member in the shaft direction forming the peripheral edge of the support hole.

7. The turbocharger according to claim 6, wherein the end part of the bush member includes a groove portion, and the seal member includes a projection which is fitted into the groove portion.

* * * * *